United States Patent
Kawashima et al.

(10) Patent No.: US 8,604,732 B2
(45) Date of Patent: Dec. 10, 2013

(54) INVERTER UNIT

(75) Inventors: Takashi Kawashima, Aichi-ken (JP); Kazuki Najima, Aichi-ken (JP); Yoshiki Nagata, Aichi-ken (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 14 days.

(21) Appl. No.: 13/354,923

(22) Filed: Jan. 20, 2012

(65) Prior Publication Data

US 2012/0194111 A1   Aug. 2, 2012

(30) Foreign Application Priority Data

Jan. 28, 2011  (JP) ................. 2011-016177

(51) Int. Cl.
 *H02P 6/14*   (2006.01)
 *H02P 21/00*  (2006.01)
 *H02P 6/06*   (2006.01)
 *G05B 11/28*  (2006.01)
 *H02P 27/04*  (2006.01)

(52) U.S. Cl.
 USPC ............ 318/400.27; 318/400.02; 318/400.06; 318/599; 318/801

(58) Field of Classification Search
 USPC ........... 318/400.02, 400.06, 400.27, 599, 801
 See application file for complete search history.

(56) References Cited

U.S. PATENT DOCUMENTS

| 7,049,778 | B2 * | 5/2006 | Katanaya ................. 318/400.04 |
| 2009/0052215 | A1 * | 2/2009 | Watanabe ..................... 363/131 |
| 2012/0163046 | A1 * | 6/2012 | Hibino ............................ 363/37 |

FOREIGN PATENT DOCUMENTS

| JP | 10-201288 A  | 7/1998 |
| JP | 2002-095263 A | 3/2002 |
| JP | 2005-192358 A | 7/2005 |
| JP | 2008-148476 A | 6/2008 |

* cited by examiner

*Primary Examiner* — Lincoln Donovan
*Assistant Examiner* — Gabriel Agared
(74) *Attorney, Agent, or Firm* — Sughrue Mion, PLLC

(57) ABSTRACT

The two-phase modulation control inverter unit includes a plurality of switching devices, a shunt resistor and a controller. The switching devices drive a three-phase motor. The shunt resistor is connected between a direct-current power supply and the switching devices. The controller reads a voltage applied to the shunt resistor in a read cycle, computes command voltages based on the read voltage, and uses the command voltages and carrier signals to compute three control signals. The read cycle corresponds to two or more signal cycles of each carrier signal. Each control signal has a pulse for each signal cycle of the corresponding carrier signal. The controller integrates a plurality of pulses of each control signal in the read cycle into one or more pulses. The controller reads a voltage applied to the shunt resistor at the time of outputting of the integrated one or more pulses in the next read cycle.

3 Claims, 6 Drawing Sheets

INVERTER UNIT

BACKGROUND OF THE INVENTION

The present invention relates to an inverter unit that drives a three-phase motor.

Japanese Unexamined Patent Application Publication No. 2005-192358 discloses a two-phase modulation control inverter unit as an inverter unit that drives a three-phase motor. The two-phase modulation control inverter unit drives a three-phase motor by estimating angular position (or electrical angle of the rotor) of the three-phase motor based on the electric currents flowing through the U phase, V phase and W phase of the three-phase motor computed from voltage applied to a shunt resistor, by switching ON and OFF the switching devices that send alternating currents to any two phases of the three phases based on the estimated angular position and also by keeping the switching devices that send an alternating current to the third phase in either ON or OFF state.

This two-phase modulation control inverter unit can reduce the switching loss as compared to a three-phase modulation control inverter unit wherein the switching devices of all three phases are switched ON and OFF.

In the case of a two-phase modulation control inverter unit for a three-phase motor that requires a low voltage, for example, when the two-phase modulation control inverter unit drives the three-phase motor at a low speed, however, the time during which the switching devices of the two phases of the three phases are ON is reduced and hence the time during which electric current flows through the shunt resistor is also reduced. In a read cycle in which the control circuit such as CPU reads voltage applied to the shunt resistor, if the pulse width of a control signal that switches ON the switching devices is smaller than the pulse width corresponding to the time that is long enough for the control circuit to read voltage applied to the shunt resistor, the control circuit fails to read the voltage, which may deteriorate the controllability of the three-phase motor.

Figure 8:
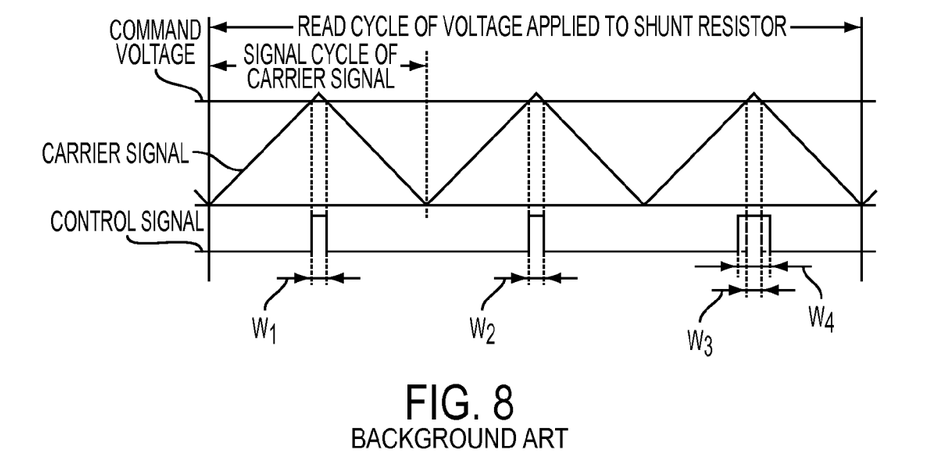
FIG. 8 is a diagram showing a control signal sent to U-phase switching devices of an inverter unit according to a background art.

When the pulse width of the control signal that switches ON the switching devices is smaller than the pulse width corresponding to the time that is long enough for the control circuit to read voltage applied to the shunt resistor in the above-described read cycle, the pulse width of the control signal that switches ON the switching devices needs to be increased in the next voltage read cycle. Referring to FIG. 8, when the read cycle of the voltage applied to the shunt resistor is three times as large as the signal cycles of the carrier signal used for pulse width modulation (PWM) control and also when the voltage is read at the time of outputting of a pulse of the control signal for the U phase computed at the third signal cycle of the carrier signal, the pulse width computed at the third signal cycle of the carrier signal needs to be made larger than those of the other two signal cycles.

When the pulse width of the control signal that switches ON the switching devices is increased in the next voltage read cycle, however, the switching devices are switched ON for an unnecessarily long time, which may deteriorate the controllability of the three-phase motor.

The present invention is directed to providing an inverter unit that drives a three-phase motor by switching ON and OFF the switching devices of two phases of three phases and also by keeping ON or OFF the switching devices of the third phase, thereby preventing the controllability of the three-phase motor from deteriorating.

SUMMARY OF THE INVENTION

In accordance with an aspect of the present invention, the inverter unit includes a plurality of switching devices, a shunt resistor and a controller. The switching devices are switched ON and OFF to convert an output of a direct-current power supply to three alternating currents that are out of phase with each other thereby to drive a three-phase motor. The shunt resistor is connected between the direct-current power supply and the switching devices. The controller is provided for reading a voltage applied to the shunt resistor in a read cycle when the switching devices are switched ON, computing electric currents flowing through three phases of the three-phase motor based on the read voltage, also computing command voltages based on the computed electric currents, and using the command voltages and carrier signals for pulse width modulation control to compute three control signals two of which switch ON and OFF the switching devices connected to two phases of the three phases of the three-phase motor and that the third of which keeps ON or OFF the switching devices connected to the third phase of the three phases of the three-phase motor. The read cycle corresponds to two or more signal cycles of each carrier signal. Each control signal has a pulse for each signal cycle of the corresponding carrier signal. The controller integrates a plurality of pulses of each control signal in the read cycle into one or more pulses. The controller reads a voltage applied to the shunt resistor at the time of outputting of the integrated one or more pulses in the next read cycle.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE EMBODIMENTS

Figure 1:
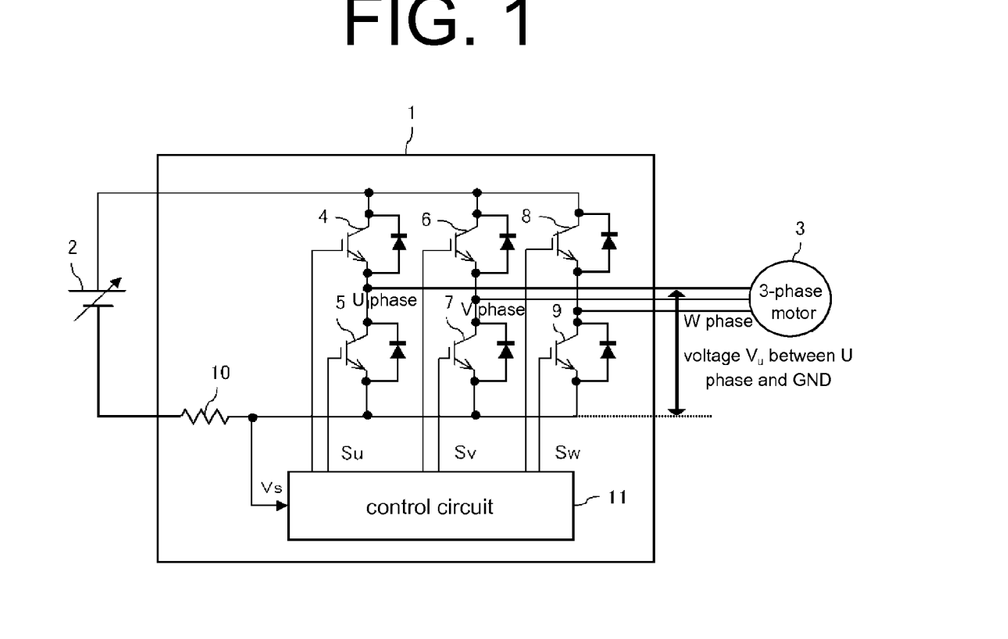
FIG. 1 is a schematic configuration diagram showing an inverter unit according to an embodiment of the present invention.

The following will describe the inverter unit according to the embodiment of the present invention with reference to the accompanying drawings. Referring to FIG. 1, the inverter unit which is designated by reference numeral 1 converts the output of a direct-current power supply 2 to three alternating currents that are out of phase with each other by 120 degrees thereby to drive a three-phase motor 3. The inverter unit 1 includes switching devices 4-9 such as MOSFET or IGBT having parallel-connected diodes, a shunt resistor 10 and a control circuit 11 that serves as the controller of the present invention.

The switching devices 4 and 5 are connected in series to each other and in parallel to the DC power supply 2. The connection point between the switching devices 4 and 5 is connected to the U phase of the three-phase motor 3. The switching devices 6 and 7 are connected in series to each other and in parallel to the DC power supply 2. The connection point between the switching devices 6 and 7 is connected to the V phase of the three-phase motor 3. The switching devices 8 and 9 are connected in series to each other and in parallel to the DC power supply 2. The connection point between the switching devices 8 and 9 is connected to the W phase of the three-phase motor 3.

The shunt resistor 10 is connected between the minus terminal of the DC power supply 2 and the respective connection points of the switching devices 5, 7 and 9. The control circuit 11 reads the voltage $V_s$ applied to the shunt resistor 10 for each read cycle $T_r$, computes the electric currents flowing through the respective phases of the three-phase motor 3 based on the read voltage $V_s$, computes the angular position (or the electrical angle of the rotor) of the three-phase motor 3 based on the computed electric currents, and calculates the U-phase, V-phase and W-phase command voltages for the three-phase motor 3 based on the computed angular position of the three-phase motor 3 and the desired speed of the three-phase motor 3.

Using the calculated command voltages and carrier signals for PWM control, the control circuit 11 produces the control signal $S_u$ that switches ON and OFF the switching devices 4 and 5 of the U phase, the control signal $S_v$ that switches ON and OFF the switching devices 6 and 7 of the V phase, and the control signal $S_w$ that switches ON and OFF the switching devices 8 and 9 of the W phase. For example, the control circuit 11 computes the electric current flowing through the U phase of the three-phase motor 3 based on the read voltage $V_s$ when the control signal $S_u$ is at a high level, the switching device 4 is switched ON and the switching device 5 is switched OFF and also computes the electric current flowing through the V phase of the three-phase motor 3 based on the read voltage $V_s$ when the control signal $S_v$ is at a high level, the switching device 6 is switched ON and the switching device 7 is switched OFF. The control circuit 11 computes the electric current flowing through the W phase based on the computed electric currents through the U phase and the V phase. Each control signal has a pulse for each signal cycle of the corresponding carrier signal.

Figure 2:
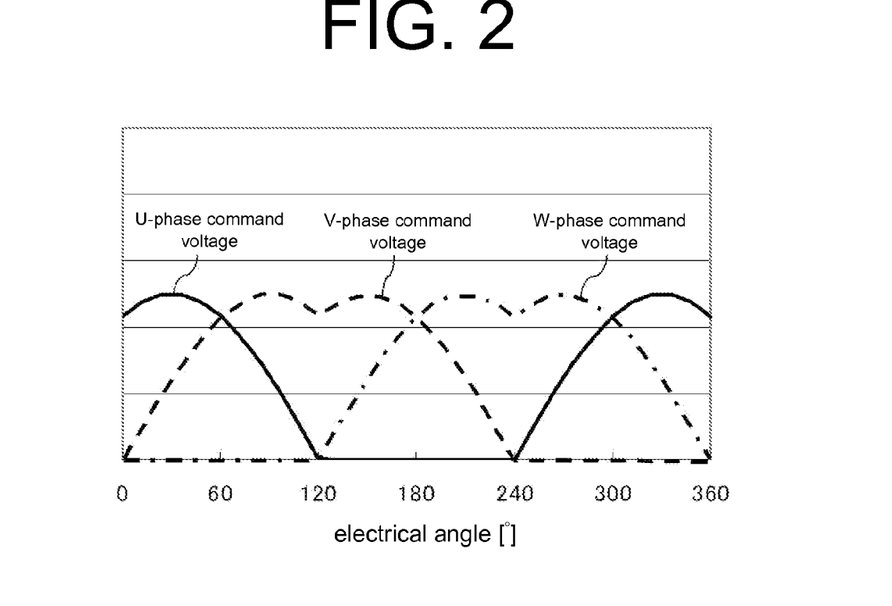
FIG. 2 is a diagram showing the levels of U-phase, V-phase and W-phase command voltages used for PWM control.
Figure 3:
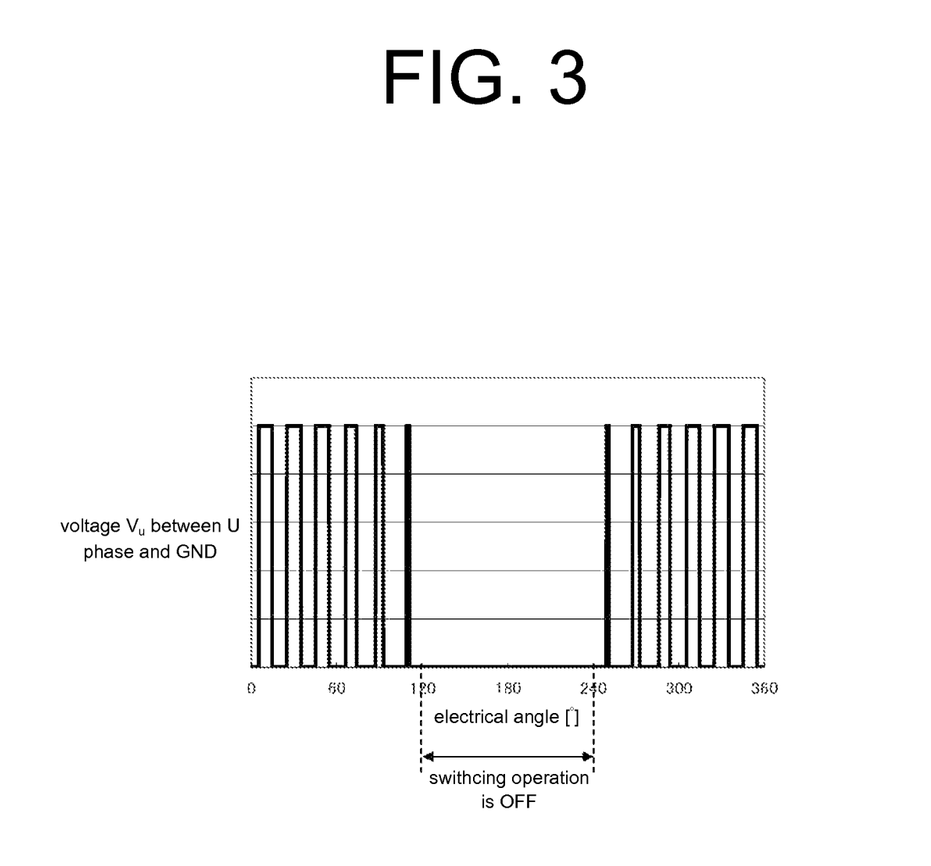
FIG. 3 is a diagram showing voltages between the U phase and ground (GND)

In the case where the control circuit 11 uses the U-phase, V-phase and W-phase command voltages shown in FIG. 2 for PWM control, when the angular position of the three-phase motor 3 is in the range of 120° to 240°, the switching devices 4 and 5 are kept ON or OFF while the switching devices 6-9 are being switched ON and OFF. Since the switching operation of the switching devices 4 and 5 is stopped with the angular position of the three-phase motor 3 in the range of 120° to 240°, the voltage between the U phase and the ground (GND) is a ground potential, as shown in FIG. 3.

Figure 4:
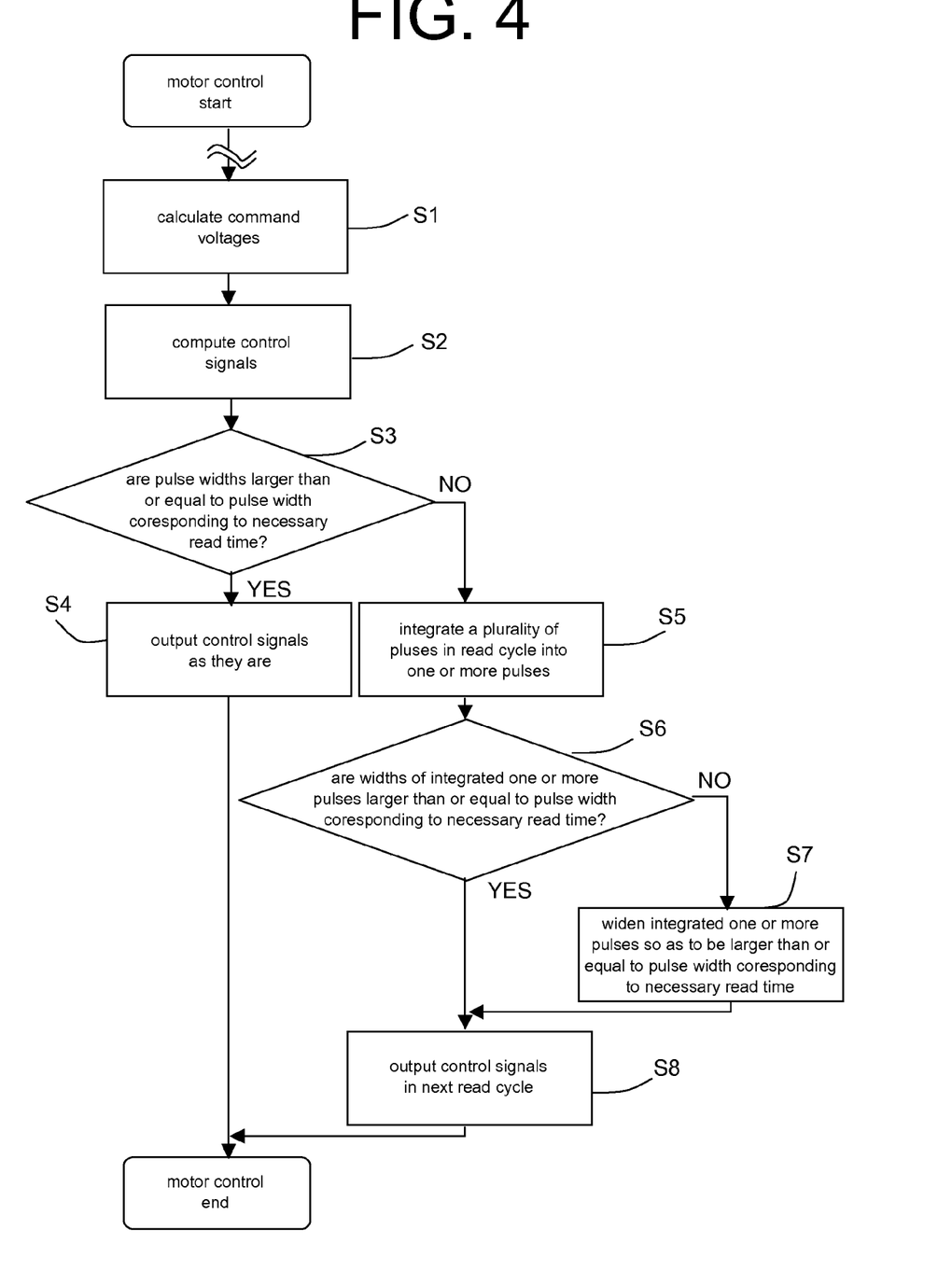
FIG. 4 is a flowchart illustrating operation of a control circuit of the inverter unit.

Referring to the flowchart of FIG. 4 illustrating the operation of the control circuit 11, firstly at the step S1, the control circuit 11 reads the voltage $V_s$ applied to the shunt resistor 10 in a read cycle $T_r$ and calculates the command voltages corresponding to the respective phases of the three-phase motor 3 based on the read voltage $V_s$, as described above, at the step S1.

At the next step S2, the control circuit 11 uses the command voltages calculated at the step S1 and carrier signals for PWM control, thereby to compute three control signals $S_u$, $S_v$ and $S_w$ two of which switch ON and OFF the switching devices of any two phases of the three-phase motor 3 and the third of which keeps the switching devices of the third phase of the three-phase motor 3 in ON or OFF state.

At the next step S3, the control circuit 11 determines whether or not the pulse widths of any two of the control signals $S_u$, $S_v$ and $S_w$ computed at the step S2 and used to switch ON and OFF their corresponding switching devices are larger than or equal to the pulse width of the control signal corresponding to a time that is long enough for the control circuit 11 to read the voltage $V_s$.

If YES at the step S3, or if the pulse widths of the control signals that switch ON and OFF the switching devices of the two phase are larger than or equal to the pulse width of the control signal corresponding to a time that is long enough for the control circuit 11 to read the voltage $V_s$, the control circuit 11 sends the control signals $S_u$, $S_v$ and $S_w$ computed at the step S2 as they are to the switching devices 4-9 in the next read cycle $T_r$ at the step S4.

If NO at the step S3, or if the pulse widths of the control signals that switch ON and OFF the switching devices of the two phase are smaller than the pulse width of the control signal corresponding to a time that is long enough for the control circuit 11 to read the voltage $V_s$, the control circuit 11 integrates a plurality of pulses of each of the control signals that switch ON and OFF the switching devices of the two phases into one or more pulses at the time of reading of the voltage $V_s$ at the step S5.

Then, at the step S6, the control circuit 11 determines whether or not the widths of the one or more pulses integrated at the step S5 are larger than or equal to the pulse width of the control signal corresponding to a time that is long enough for the control circuit 11 to read the voltage $V_s$. If NO at the step S6, or if the widths of the one or more pulses integrated at the step S5 are smaller than the pulse width of the control signal corresponding to a time that is long enough for the control circuit 11 to read the voltage $V_s$, the control circuit 11 widens the one or more pulses integrated at the step S5 to such an extent that the pulse widths are larger than or equal to the pulse width of the control signal corresponding to a time that is long enough for the control circuit 11 to read the voltage $V_s$, at the step S7. Then, at the step S8, the control circuit 11 sends only the widened integrated one or more pulses to the corresponding switching devices in the next read cycle $T_r$. The control circuit 11 reads the voltage $V_s$ at the time of outputting of the widened integrated one or more pulses.

If NO at the step S6, or if the widths of the one or more pulses integrated at the step S5 are smaller than the pulse width of the control signal corresponding to a time that is long enough for the control circuit 11 to read the voltage $V_s$, the control circuit 11 may widen the one or more pulses integrated at the step S5 to such an extent that the pulse widths are equal to the pulse width of the control signal corresponding to a time that is long enough for the control circuit 11 to read the voltage $V_s$.

If YES at the step S6, or if the widths of the one or more pulses integrated at the step S5 are larger than or equal to the pulse width of the control signal corresponding to a time that is long enough for the control circuit 11 to read the voltage $V_s$, on the other hand, the control circuit 11 sends only the one or more pulses integrated at the step S5 to the corresponding switching devices in the next read cycle $T_r$ at the step S8. The control circuit 11 reads the voltage applied to the shunt resistor 10 at the time of outputting of the one or more pulses integrated at the step S5.

Figure 5:
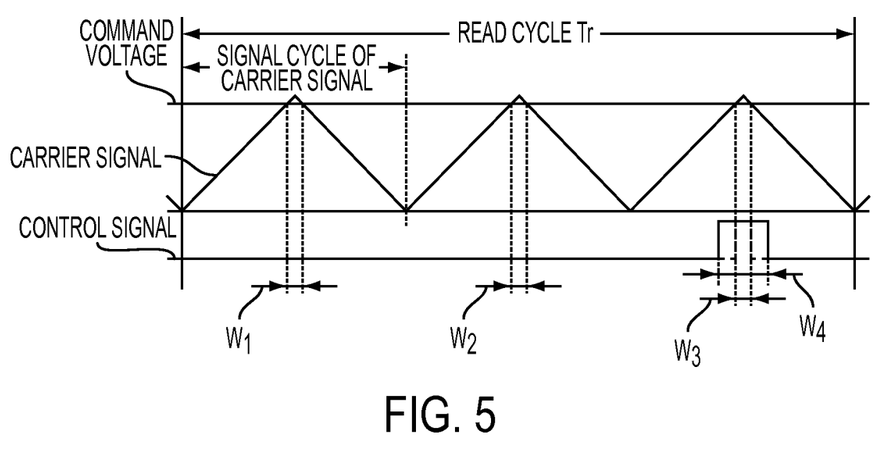
FIG. 5 is a diagram showing a control signal sent to U phase switching devices of the inverter unit.

For example, it is assumed that one read cycle $T_r$ corresponds to three signal cycles of carrier signal and also that the voltage applied to the shunt resistor 10 is read at the time of outputting of a pulse of the control signal $S_u$ computed at the third signal cycle of the carrier signal, as shown in FIG. 5.

In such a case, if the pulse width of the control signal $S_u$ computed at the third signal cycle of the carrier signal is smaller than the pulse width of the control signal corresponding to a time that is long enough for the control circuit 11 to read the voltage $V_s$, the pulse of the control signal $S_u$ computed at the first signal cycle of the carrier signal and the pulse of the control signal $S_u$ computed at the second signal cycle of the carrier signal are integrated with the pulse of the control signal $S_u$ computed at the third signal cycle of the carrier signal. In the next read cycle $T_r$, generation of the pulses of the control signal $S_u$ computed at the first and second signal cycles of the carrier signal is inhibited and the integrated pulse is outputted.

If the width of the integrated pulse is smaller than the pulse width of the control signal corresponding to the time that is long enough for the control circuit 11 to read the voltage $V_s$, the integrated pulse is further widened in the next read cycle $T_r$ to such an extent that the pulse width larger than or equal to the pulse width of the control signal corresponding to the time that is long enough for the control circuit 11 to read the voltage $V_s$. In the next read cycle $T_r$, generation of the pulses of the control signal $S_u$ computed at the first and second signal cycles of the carrier signal is inhibited and the further widened integrated pulse is outputted.

The pulses of the control signal $S_u$ computed at the second and the third signal cycles of the carrier signal may be integrated with the pulse of the control signal $S_u$ computed at the first signal cycle of the carrier signal. The pulses of the control signal $S_u$ computed at the first and the third signal cycles of the carrier signal may be integrated with the pulse of the control signal $S_u$ computed at the second signal cycle of the carrier signal. The length of the read cycle $T_r$ may correspond to two or more signal cycles of the carrier signal.

The pulse of the control signal $S_u$ computed at the first signal cycle of the carrier signal may be divided into two parts, one of which is integrated with the pulse of the control signal $S_u$ computed at the second signal cycle of the carrier signal and the other of which is integrated with the pulse of the control signal $S_u$ computed at the third signal cycle of the carrier signal. In this case, generation of the pulse of the control signal $S_u$ computed at the first signal cycle of the carrier signal in the next read cycle $T_r$ is inhibited. The pulse of the control signal $S_u$ computed at the second signal cycle of the carrier signal may be divided into two parts, one of which is integrated with the pulse of the control signal $S_u$ computed at the first signal cycle of the carrier signal and the other of which is integrated with the pulse of the control signal $S_u$ computed at the third signal cycle of the carrier signal. In this case, generation of the pulse of the control signal $S_u$ computed at the second signal cycle of the carrier signal in the next read cycle $T_r$ is inhibited.

In the above-described inverter unit 1, when the pulse width of the control signal is smaller than the pulse width of the control signal corresponding to the time that is long enough for the control circuit 11 to read the voltage $V_s$, the pulses of each of the control signals that switch ON and OFF the switching devices of the two phases are integrated into one or more pulses. The voltage $V_s$ in the next read cycle $T_r$ is read at the time of outputting of the integrated one or more pulses.

According to the inverter unit 1 of the present embodiment, even if the voltage necessary for operating the three-phase motor 3 is reduced and the pulse width is also reduced, accordingly, the voltage applied to the shunt resistor 10 is prevented from being unreadable. In addition, the switching devices of each phase are prevented from being switched ON for an excessive length of time in the next read cycle $T_r$. Therefore, the controllability of the three-phase motor 3 is prevented from deteriorating.

When the inverter unit 1 is used for driving a three-phase motor provided in the compressor of a heat pump, the three-phase motor can be driven while reducing its switching loss or heat generation by the two-phase modulation control. Thus, if the three-phase motor is driven at a low speed to reduce the flow of refrigerant, the temperature rise of the inverter unit 1 is reduced. Therefore, the shutdown of the heat pump due to the temperature rise is prevented and hence the heat pump can be operated in a wider range while maintaining the controllability of the three-phase motor.

If the control circuit 11 determines that the pulse widths of the control signals that switches ON and OFF the switching devices of the two phases are larger than or equal to the pulse width of the control signal corresponding to the time that is long enough for the control circuit 11 to read the voltage $V_s$, or if YES at the step S3 in the flowchart of FIG. 4, the control circuit 11 may be operated in such a way that when the temperature detected by a temperature sensor provided in the inverter unit 1 is at a threshold level $T_{th1}$ or higher, the pulse of the control signal computed at the first signal cycle of the carrier signal of the pulses shown in FIG. 5 is divided into two parts, one of which is integrated with the pulse of the control signal computed at the second signal cycle of the carrier signal and the other of which is integrated with the pulse of the control signal computed at the third signal cycle of the carrier signal and that generation of the pulse of the control signal computed at the first signal cycle of the carrier signal is inhibited. By so controlling, the switching loss of the inverter unit 1 is reduced. In addition, the control circuit 11 may also be operated in such a way that when the temperature detected by the temperature sensor provided in the inverter unit 1 is at or higher than a threshold level $T_{th2}$ that is higher than the threshold level $T_{th1}$, the pulses of the control signal computed at the first and second signal cycles of the carrier signal of the pulses shown in FIG. 5 are integrated with the pulse of the control signal computed at the third signal cycle of the carrier signal and that generation of the pulses of the control signal computed at the first and second signal cycles of the carrier signal is inhibited. By so controlling, the switching loss is further reduced.

Figure 6:
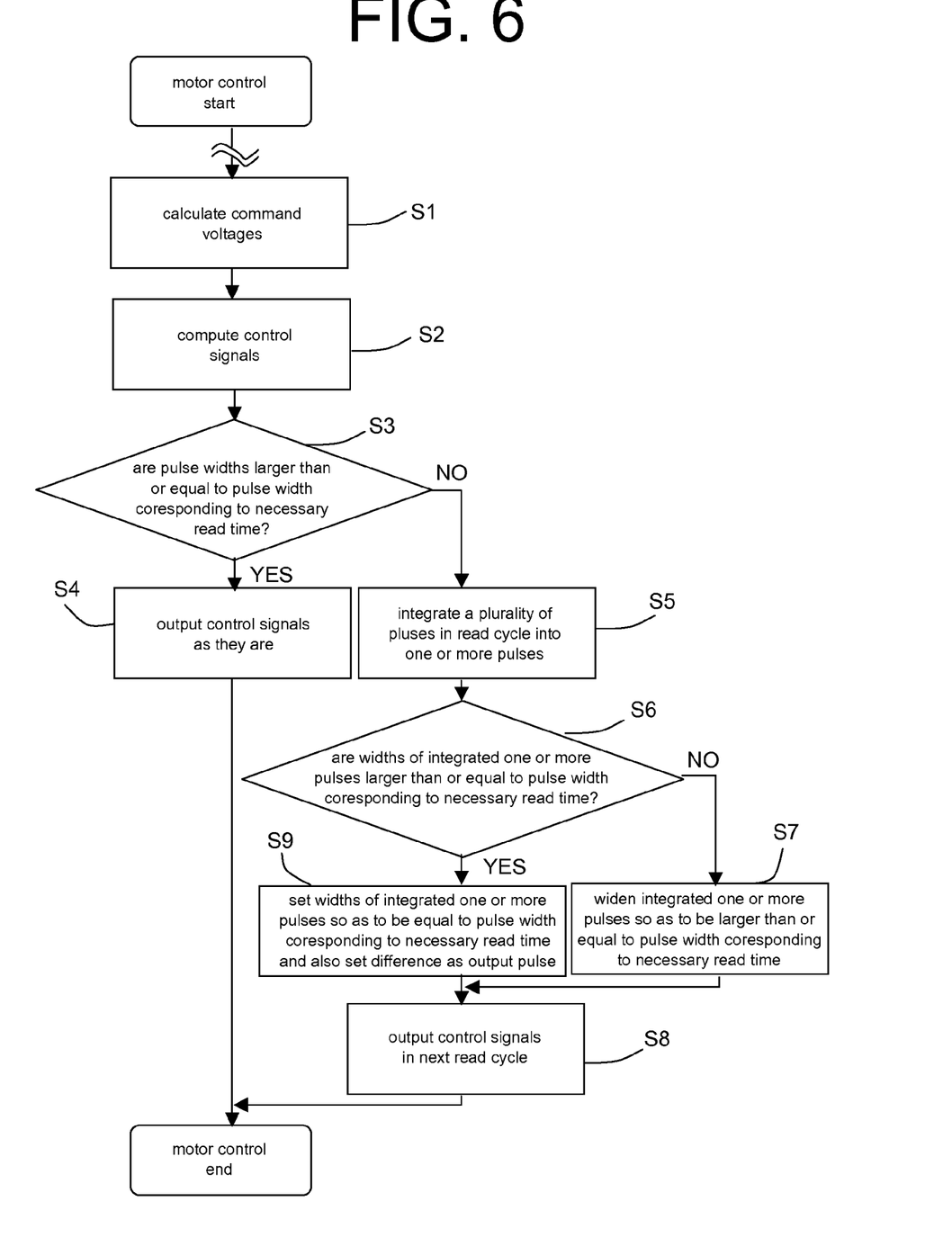
FIG. 6 is a flowchart illustrating operation of a control circuit of an inverter unit according to a modification of the embodiment.

Referring to FIG. 6, the flowchart illustrates a modified operation of the control circuit 11. The operations performed at the steps S1 to S6 and the operations after NO at the step S6 which are substantially the same as the corresponding operations shown in FIG. 4 will be omitted.

If the control circuit 11 determines that the widths of the one or more pulses integrated at the step S5 are larger than or equal to the pulse width of the control signal corresponding to the time that is long enough for the control circuit 11 to read the voltage $V_s$, or if YES at the step S6, the control circuit 11 narrows the one or more pulses integrated at the step S5 to such an extent that the pulse widths are equal to the pulse width of the control signal corresponding to the time that is long enough for the control circuit 11 to read the voltage $V_s$. At the step S9, the control circuit 11 sets the pulse corresponding to the difference between the widths of the one or more pulses integrated at the step S5 and the pulse width of the control signal corresponding to the time that is long enough for the control circuit 11 to read the voltage $V_s$ as the pulse to be outputted in the signal cycles of the carrier signal in the next read cycle $T_r$, other than the signal cycle in which the narrowed integrated one or more pulses are outputted. The control circuit 11 sends the pulse corresponding to the above difference and the narrowed integrated one or more pulses to their corresponding switching devices in the next read cycle $T_r$ at the step S8, and reads the voltage $V_s$ at the time of outputting of the narrowed integrated one or more pulses.

Figure 7:
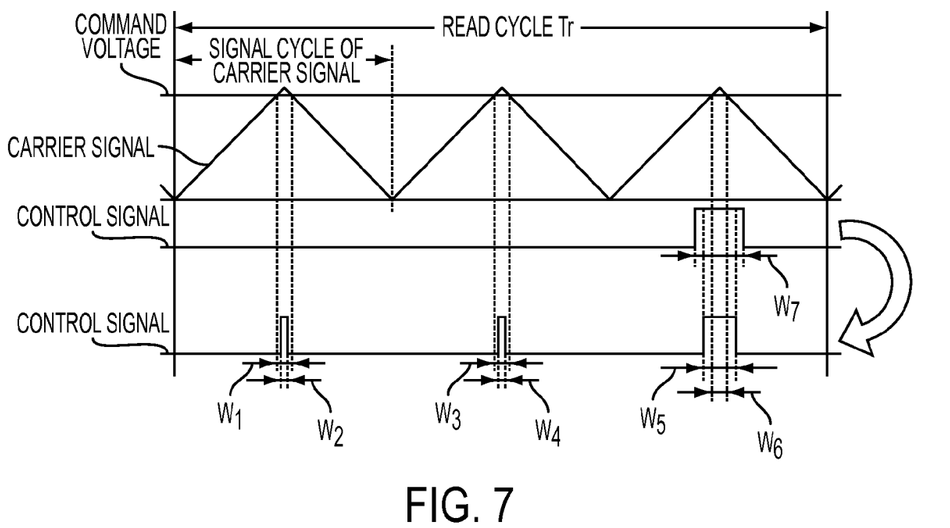
FIG. 7 is a diagram showing a control signal sent to U-phase switching devices of the inverter unit according to the modification.

For example, it is assumed that one read cycle $T_r$ corresponds to three signal cycles of carrier signal and that the voltage applied to the shunt resistor 10 is read at the time of outputting of a pulse of the control signal $S_u$ computed at the third signal cycle of the carrier signal, as shown in FIG. 7.

In such a case, if the widths of the one or more pulses integrated at the step S5 are larger than or equal to the pulse width of the control signal corresponding to the time that is long enough for the control circuit 11 to read the voltage $V_s$, the pulse corresponding to the difference between the widths of the one or more pulses integrated at the step S5 and the pulse width of the control signal corresponding to the time that is long enough for the control circuit 11 to read the voltage $V_s$ is divided into two parts, one of which is set as the pulse computed at the first signal cycle of the carrier signal and the other of which is set as the pulse computed at the second signal cycle of the carrier signal. The one or more pulses integrated at the step S5 are narrowed to such an extent that the pulse widths are equal to the pulse width of the control signal corresponding to the time that is long enough for the control circuit 11 to read the voltage $V_s$ and such pulse is set as the pulse computed at the third signal cycle of the carrier signal.

Thus operating the control circuit 11, the controllability of the three-phase motor 3 is prevented from deteriorating as in the case where the operation of the control circuit 11 is performed in accordance with the flowchart shown in FIG. 4. Although in the above-described embodiment the electric current flowing through each phase of the three-phase motor 3 is computed based on the voltage applied to a single shunt resistor 10, the number of shunt resistors connected between the DC power supply 2 and the switching devices 4-9 may be two or more.

What is claimed is:

1. An inverter unit comprising:
    a plurality of switching devices that are switched ON and OFF to convert an output of a direct-current power supply to three alternating currents that are out of phase with each other thereby to drive a three-phase motor;
    a shunt resistor connected between the direct-current power supply and the switching devices; and
    a controller for reading a voltage applied to the shunt resistor in a read cycle when the switching devices are switched ON, computing electric currents flowing through three phases of the three-phase motor based on the read voltage, also computing command voltages based on the computed electric currents, and using the command voltages and carrier signals for pulse width modulation control to compute three control signals two of which switch ON and OFF the switching devices connected to two phases of the three phases of the three-phase motor and the third of which keeps ON or OFF the switching devices connected to the third phase of the three phases of the three-phase motor, wherein the read cycle corresponds to two or more signal cycles of each carrier signal,
    wherein each control signal has a plurality of pulses for the respective signal cycles of the carrier signal corresponding in the read cycle,
    wherein the controller inhibits generation of the pulse of the control signal computed at one of the signal cycles of the carrier signal to integrate the pulse whose generation is inhibited with the pulse or other pulses of the control signal computed at the other signal cycle or cycles of the carrier signal in the next read cycle, and
    wherein the controller reads a voltage applied to the shunt resistor at the time of outputting of the integrated one or more pulses in the next read cycle,
    wherein if widths of the integrated one or more pulses are larger than a pulse width of the control signal corresponding to a time that is enough for the controller to read the voltage applied to the shunt resistor, the controller narrows the integrated one or more pulses to such an extent that the widths of the integrated one or more pulses are equal to the pulse width of the control signal corresponding to a time that is enough for the controller to read the voltage applied to the shunt resistor,
    wherein the controller sets a pulse corresponding to difference between the widths of the integrated one or more pulses and the pulse width of the control signal corresponding to a time that is enough for the controller to read the voltage applied to the shunt resistor as a pulse to be outputted in the signal cycles of the carrier signal in the next read cycle, other than the signal cycle in which the narrowed integrated one or more pulses are outputted, and
    wherein the controller sends the pulse corresponding to the difference to the corresponding switching devices in the next read cycle.

2. The inverter unit according to claim 1, wherein if pulse widths of the control signals that switch ON the switching devices are smaller than a pulse width of the control signal corresponding to the time that is enough for the controller to read the voltage applied to the shunt resistor, the controller inhibits generation of the pulse of the control signal computed at one of the signal cycles of the carrier signal to integrate the pulse whose generation is inhibited with the other pulse or pulses of the control signal computed at the other signal cycle or cycles of the carrier signal in the next read cycle, and
    wherein the controller reads the voltage applied to the shunt resistor at the time of outputting of the integrated one or more pulses in the next read cycle.

3. The inverter unit according to claim 1, wherein if widths of the integrated one or more pulses are smaller than a pulse width of the control signal corresponding to the time that is enough for the controller to read the voltage applied to the shunt resistor, the controller widens the integrated one or more pulses to such an extent that the widths of the integrated one or more pulses are larger than or equal to the pulse width of the control signal corresponding to the time that is enough for the controller to read the voltage applied to the shunt resistor.

* * * * *